United States Patent [19]

Rainer

[11] 4,085,186

[45] Apr. 18, 1978

[54] PROCESS FOR PRODUCING FLOW-IN CLOSURE SEALING GASKETS FROM HOT MELT COMPOSITIONS

[75] Inventor: William C. Rainer, Barrington, R.I.

[73] Assignee: CPL Corporation, E. Providence, R.I.

[21] Appl. No.: 637,851

[22] Filed: Dec. 5, 1975

[51] Int. Cl.$^2$ ............................................. B29C 13/02
[52] U.S. Cl. ................................ 264/268; 260/876 B; 260/878 B; 260/879; 260/880 R; 264/322
[58] Field of Search ................ 264/268, 267, 299, 322; 260/880 R, 878, 879, 876 B

[56] References Cited

U.S. PATENT DOCUMENTS

| | | | |
|---|---|---|---|
| 2,654,914 | 10/1953 | Maier | 264/268 |
| 3,125,459 | 3/1964 | Foye | 117/43 |
| 3,135,019 | 6/1964 | Aichele | 264/268 |
| 3,164,486 | 1/1965 | Pezzuto et al. | 117/43 |
| 3,235,643 | 2/1966 | Hofer | 264/268 |
| 3,239,478 | 3/1966 | Harlan, Jr. | 260/876 B |
| 3,547,746 | 12/1970 | Gwinner | 264/268 |
| 3,576,913 | 4/1971 | Johnson et al. | 260/876 B |
| 3,600,347 | 8/1971 | Godar | 260/876 R |
| 3,686,107 | 8/1972 | Russell | 260/876 B |
| 3,695,477 | 10/1972 | Edmonston et al. | 260/876 B |
| 3,779,965 | 12/1973 | Lefforge et al. | 260/28.5 B |
| 3,850,858 | 11/1974 | Park | 260/880 B |
| 3,866,845 | 2/1975 | Keeler et al. | 215/341 |

FOREIGN PATENT DOCUMENTS

| | | | |
|---|---|---|---|
| 1,112,025 | 5/1968 | United Kingdom | 264/268 |

*Primary Examiner*—Jeffery R. Thurlow
*Attorney, Agent, or Firm*—Kenway & Jenney

[57] ABSTRACT

A hot melt composition for forming flowed-in closure liners or gaskets having a viscosity and resulting flow properties suitable for use in high speed, liner forming operations. The composition comprises between 20 and 55 percent of a thermoplastic elastomer chosen from the group consisting of block copolymers of the type having the general formula A-B-A or of the type having a plurality of chains of the general formula B-A radiating from a central hub. A is a thermoplastic segment, preferably polystyrene, and B is an elastomeric segment, preferably polybutadiene, polyisoprene, or polyethylene-butylene. The other ingredients in the composition may be extenders, antioxidants, fillers, pigments, lubricants, etc. as desired.

An in-situ molded crown liner, ring-seal bottle cap gasket, roll-on closure liner, CT (screw) cap gasket, lug cap gasket, and snap-on cap gasket, made from the composition and containing no PVC, are disclosed.

A hot melt process for producing liners is also disclosed which is characterized by the steps of providing a hot melt composition which cools to a coherent elastomeric mass, heating the composition to cause it to flow, depositing a metered amount of the molten liquid composition from a dispensing nozzle into a closure shell, shaping the composition to the desired shape, and cooling the formed liner.

7 Claims, 5 Drawing Figures

PROCESS FOR PRODUCING FLOW-IN CLOSURE SEALING GASKETS FROM HOT MELT COMPOSITIONS

BACKGROUND OF THE INVENTION

This invention relates to a vinyl chloride free resinous composition useful in a hot melt process for gasketing closures, and to closure sealing gaskets made from such compositions by a hot melt process.

In the bottling of carbonated beverages and the like, an air tight closure is applied over the opening of the container, for instance, the mouth of a bottle, to retain the carbonation of the contents and to protect the contents from contamination. Crowns for such bottles are made of metal having uniform ductility and even temper and are crimped in place. Recently, a second type of bottle closure has been developed known as the roll-on closure, which comprises a soft aluminum, generally closed end cylindrical cap which is rolled onto the bottle neck, in the process being deformed to define threads. To provide an air-tight seal, these types of closures are lined with a sealing gasket consisting of cork, polyethylene, polyvinyl chloride (PVC), or other plastic material.

Another type of closure gasket is formed on the underside of caps designed for use on wide-mouth bottles used for packaging spreads, fruits and vegetables, mayonnaise, condiments and the like. These gaskets typically take the form of an annular ring positioned about the circumference of the interior of the cap which seals against the lip of the jar when the cap is in place. Such annular gaskets may be used to seal crowns, roll-on caps, CT (screw) caps, lug caps, and other caps.

To be effective, such gaskets should, preferably, be adhered to the interior of the closure and must be capable of uniformly contacting the mouth of the bottle. In this regard, it is imperative that the closure be elastomeric and soft enough so that is can conform to the shape of the mouth of the jar or bottle and so that no passage remains through which liquid or gas can pass. Particularly in the case of roll-on closures and widemouth bottle caps, since they are designed for reuse, it is necessary that the gasket or liner have some elasticity and some permanent set so that the seal can be reformed after the closure has been initially removed. In addition to these requirements, it is important that the liner be made of a material which will not impart any undesirable odor or taste and not contaminate the contents of the bottle. The ideal liner should also be stable when subjected to water, weak acids, alcohol, and temperatures to which it may be subjected during use, e.g., pasteurization temperature.

To be commercially successful, liners of the type described must not only have the above-recited properties, but also must be capable of being manufactured in a simple, inexpensive, and automated fashion. The most successful liner material in general use today has for its main ingredient a fluxed plastisol which basically comprises a dispersion of colloidal sized thermoplastic resin particles, usually PVC, in a liquid plasticizer in which the resin is insoluble or only slightly soluble at room temperature. In addition to the basic component, to accomplish conventional purposes, other ingredients such as extenders, fillers, pigments, stabilizers, wetting agents, and thickeners are included in the composition. Also, when a fluxed cellular liner is desired, gas may be dispersed in the plastisol or a blowing agent may be incorporated which will decompose at the fluxing temperature of the composition.

In use, the liner forming material is heated to about 46° C, and a metered amount is forced through a nozzle of predetermined size into a closure shell which, typically, has a vinyl based epoxy or phenolic coating on its interior. The liner is then shaped by a molding punch heated to 175° to 205° C and transferred to an oven. Exposure to the oven temperature for between 7 to 60 seconds (depending on the type of oven) causes the resin to become substantially completely solvated by the plasticizer and yields a homogeneous solid solution which transforms itself to a rubbery mass on cooling. In an alternative procedure, the heated punch is eliminated and the liner is shaped by rotating the closure shell at high speeds. In the case of wide-mouth bottle caps, the gasket is shaped by rotating the closure shell while a ring of compound is laid down in the sealing area of the closure.

In a typical system of this type, operating to produce about 500 liners per minute, 100,000 BTUs per hour per line, excluding the fusing oven, are used, and roughly 250,000 BTUs per hour are consumed in each fusing oven alone.

One factor in the successful operation of a high speed liner system is the liner forming composition's viscosity. It is essential that a uniformly sized drop of the composition be deposited in each closure shell or a uniform bead of material be deposited in the sealing area of the wide-mouth bottle cap or crown. If the viscosity of the composition fluctuates because of variations in the temperature or other reasons, the size of the drop or thickness of the bead deposited will vary and a high frequency of rejects will result.

One drawback of the liner forming method described above is the relatively large amount of energy consumed in the lining process. Another drawback, the import of which cannot be ignored, is that vinyl chloride is a suspected carcinogen. The polyvinyl chloride dispersed in the plastisol is known to contain some unpolymerized vinyl chloride, and if trace amounts of the monomer are allowed to mix with substances intended for human consumption, a potentially very serious health hazard results. It has recently been reported that the Food and Drug Administration has banned the use of PVC in rigid and semi-rigid food packaging items. The use of PVC in contact with any consumable substance may be regulated in the near future.

Accordingly, it is a principle object of the present invention to provide a hot melt composition for producing closure liners which contain no polyvinyl chloride and to thus eliminate the possibility that vinyl chloride monomer may contaminate the contents of the bottled substance.

Another object of the invention is to provide a process which is substantially more energy efficient than the plastisol process yet can be adapted for use in high speed liner forming systems.

Still a further object of the invention is to eliminate most of the air-polluting effluents normally associated with the fusing of plastisol closure liners or gaskets.

Still another object of the invention is to provide a method of manufacturing closure liners which can utilize much of the equipment presently used in the plastisol process.

Another object of the invention is to provide a gasket of the class described having all the desired characteristics of the prior art closure liners or gaskets which can be manufactured relatively inexpensively and at high speed.

Yet another object of the invention is to provide a liner which may be adhered to the interior of the closure shell by an inexpensive resinous coating instead of the more expensive vinyl based epoxy or phenolic resins used with plastisol liners.

SUMMARY OF THE INVENTION

In general, a hot melt composition is provided which has suitable flow properties for high speed lining or gasketing closures, which comprises between 20 to 55 percent of a thermoplastic elastomer chosen from the group consisting of triblock copolymers of the type having the general formula A-B-A, wherein A is a thermoplastic segment and B is an elastomeric segment, and radial block copolymers of the type having a plurality of chains having the general formula B-A, wherein B is linked to a central hub and is an elastomer segment, and A is a thermoplastic segment. In the preferred embodiment, A is polystyrene, B is chosen from the group consisting of polybutadiene, polyisoprene, and polyethylene-butylene, and the remainder of the composition comprises extenders, antioxidants, fillers, lubricants, pigments, etc. as desired.

According to another aspect of the invention, a hot melt process for producing closure liners is disclosed which is characterized by the steps of providing an elastomeric composition capable of flowing when heated and retaining a given shape when cooled, heating the composition to cause it to flow, depositing a metered amount of the molten composition from a nozzle into a closure shell, shaping the closure liner in the closure shell, and cooling the formed closure liner. In preferred embodiments of the process, the composition is heated to between 160° and 210° C; the closure shell is heated to about 65° C or higher, and the liner is shaped using a non-heated die.

In still another aspect of the invention, vinyl chloride-free closure gaskets made from the composition of the invention are provided.

Other objects and features of the invention will be in part apparent and in part pointed out hereinafter.

DESCRIPTION OF THE PREFERRED EMBODIMENT

Figure 1:
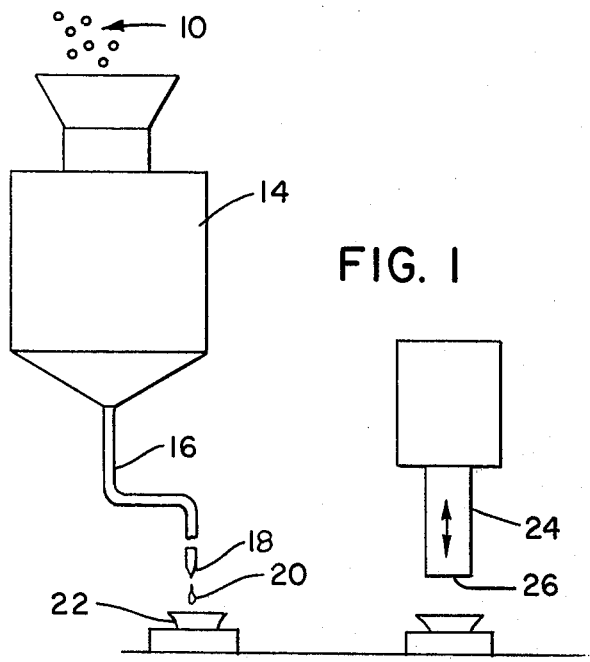
FIG. 1 is a schematic diagram illustrating some of the steps of the process of the invention.

In its broadest overall aspect, the invention provides a resinous composition which may be sold in pellet or crumb form for use in producing closure sealing gaskets or liners. Throughout this specification, the terms "liner" and "gasket" are used interchangeably. The main ingredient of the composition is a thermoplastic-elastomeric block copolymer of the type which displays high tensile strength without vulcanization. Di-block copolymers are not useful in the invention, except as possible extenders, but both triblock copolymers of the general formula ABA, where B is an elastomeric segment and A is a thermoplastic segment, and radial block copolymers of the type having a central hub and a plurality of copolymer chains eminating therefrom having the general formula AB, where B is an elastomeric segment and is attached to the hub, and A is a thermoplastic outer segment, are useable.

These copolymers are characterized by rubber-like properties similar to those of conventional rubber vulcanizates and flow properties similar to thermoplastics at temperatures above the glass transition temperature of the end blocks. The melt behavior of these compounds, with respect to shear and temperature, is similar to the behavior of conventional thermoplastics, but melt viscosities are very much higher than those of either homopolymer of the same molecular weight. Such block copolymers have been shown to exhibit a structure wherein the elastomeric and thermoplastic segments exist in separate phases. As long as the temperature is maintained below the softening point of the thermoplastic blocks, the molecules remain pinned at each end by association of the thermoplastic segments into "domains" which are connected by flexible elastomeric chains. Thus, an elastomeric network is formed with physical cross-links in the place of the chemical cross-links of vulcanizates. When heated above the glass transition temperature of the thermoplastic segments, the domains are broken up and the polymers soften and flow.

In principle, A can be any polymer normally regarded as thermoplastic, e.g., polystyrene, polymethylmethacrylate, polypropylene, etc., and B can be any polymer normally regarded as elastomeric, e.g., polyisoprene, polybutadiene, polyisobutylene, polyethylene-butylene, etc. In addition to the choice of the blocks, two other parameters influence the physical behavior of these compounds: total molecular weight, and the relative proportion of the two types of segments present. The mechanical properties of such block copolymers are essentially unaffected by molecular weight changes, however, the viscosities are quite sensitive to total molecular weight changes and this sensitivity is particularly apparent at low shear rates. Since none of these block copolymers exhibit Newtonion viscosity behavior, it is not possible to disclose the range of viscosities of compositions useful in the process of the invention in conventional viscosity units.

Changes in the relative proportions of the thermoplastic and elastomeric segments significantly influence both the mechanical and the flow properties of these block copolymers. As an example, a triblock copolymer wherein A is polystyrene and B is polybutadiene undergoes the following changes when the percent styrene content is varied. With a 13% styrene content, the polymer behaves like an undercured conventional vulcanizate. On increasing the styrene content to 27.5%, the behavior of the polymer is closer to that of the conventional vulcanizates. At higher styrene contents (30 to 53 percent) the polymers exhibit a yield followed by a drawing and then an elastic extension. At even higher styrene content (65%), a very high yield stress is followed by a short draw and immediate break. In addition, as the styrene content is increased, the viscosity of the polymer goes through a pronounced maximum and then decreases.

In the linear triblock copolymers useful in this invention, A, the thermoplastic segment, is preferably a polymerized alkenyl aromatic compound of average molecular weight within the range of about 2,000 to 30,000. Polystyrene is a preferred material, but polymethylstyrene, polyvinyl toluene, polyvinyl naphthalene, and the like may be substituted therefor. B, the elastomeric segment, is preferably a diene polymerized from starting materials selected from the class consisting of conjugated diene hydrocarbon compounds having four to eight carbon atoms. Elastomeric copolymers of ethylene with propylene may also be useful. B is preferably polybutadiene, polyisoprene, or polyethylene-butylene having an average molecular weight per segment within the range of 10,000 to 200,000. The thermoplastic segments should contribute between about 15 and 65 percent of the molecular weight of the triblock molecule, preferably between 20 and 40 percent. Methods of synthesis of triblock compounds of this type are known to those skilled in the art and many compounds of this type are commercially available from Shell Chemical Company under the tradename Kraton.

Many of these linear triblock copolymers are subject to a degree of thermal degredation when heated to temperatures above about 150° C in the presence of oxygen. However, this disadvantage can be avoided by heating the copolymers in an inert atmosphere and substantially reduced by incorporating conventional antioxidants in the compositions. The presently preferred triblock copolymers are sold by Shell Chemical Company under the tradename Kraton G. These are characterized by significantly increased thermal stability and comprise between about 20 to 40 percent styrene and a middle block of a copolymer of ethylene with butylene.

The radial block copolymers useful in this invention are the type having a plurality of chains with the general formula BA wherein B is linked to a central hub, e.g., silicon, and A is linked to B. These compounds exhibit properties quite similar to those of the triblock copolymers but, desirably, are characterized by a lower permanent set and a higher thermal stability. A and B may be chosen, in general, from the same class of compounds as are operable with the triblock copolymers. The thermoplastic segment contributes between about 20 to 50 percent of the total molecular weight of the useful radial block copolymer molecules. In one group of radial block copolymers available commercially from Phillips Petroleum Co. under the tradename Solprene, the central hub is reputedly a silicon atom, A is polystyrene and B is either polybutadiene or polyisoprene. One presently preferred copolymer for use in this invention is Solprene 414, a 60/40 copolymer of butadiene and styrene having a molecular weight of about 150,000. Another material which is useful in the composition of the invention is a radial block copolymer having a network of between 6 and 22 di-block branches of the type disclosed above radiating from a central hub.

In accordance with the invention, a gasket forming hot melt resinous composition is mixed in, for example, a Banbury blender, using between about 20 to about 55 percent block copolymer of one or more of the type disclosed above, the remainder being made up of extenders, pigments, thickening agents, fillers, lubricants, and/or antioxidants, etc. as desired. The percent of block copolymer in the composition has been found to be a critical factor in forming the hot melt composition of the invention.

As the block copolymer content is lowered below 30%, the resulting composition increasingly loses its rubbery nature and film strength unless another elastomeric substance is used as an extender. Ethylene-vinyl acetate copolymers available commercially under the tradename Elvax from E. I. du Pont have been found well suited for use as such an extender. This class of copolymers provide film strength to the composition without seriously affecting their rubbery properties. If a thermoplastic polymer, e.g., polyethylene, is added to the composition, the desired mechanical properties of the liners formed, e.g., elasticity and durometer, are adversely affected.

On the other hand, as the block copolymers content is raised above about 50%, the resulting compositions increasingly exhibit viscosities and resulting flow properties which seriously curtail their usefulness in high speed formation of flowed-in closure liners and gaskets.

There are several other considerations which must be satisfied in the manufacture of such compositions. First, when heated to a uniform temperature well above the glass transition temperature of the thermoplastic segments, the composition as a whole must have a viscosity index which will enable a uniformly sized quantity to be deposited when a constant pressure is applied thereto. In this regard, a petroleum wax, paraffinic oil, or suitable plasticizer may be added to reduce the viscosity of the composition to an operable level.

Since, as disclosed above, the viscosity of the compositions useful in the lining process of the invention do not exhibit Newtonian behavior, the viscosity of the compositions of the examples which follow will be expressed as a "viscosity index". This parameter is measured in meter-grams torque at a given temperature. To determine the viscosity index of a particular formulation, a sample is placed in a device available commercially for measuring flow properties of polymers sold under the tradename BRABENDER PLASTI-CORDER, equipped with a standard (type 5) roller head and operated at 25 rpm. The sample is heated, and when the desired temperature has been attained, the torque is read. In general, the compositions useful in high speed liner forming systems should have a viscosity index below about 40 meter-grams torque at 175° C. Hereinafter, use of the term "viscosity index" refers to this method of measurement.

A second consideration is that the ingredients, other than the block copolymers, must be chosen so that the gasket produced has a low permanent set, is sufficiently elastomeric, and is stable when exposed to the type of bottled substances for which it is designed. In this regard, the choice of ingredients other than the thermoplastic elastomer will depend upon the particular closure lining equipment available and the end use to which the gasketed closure will be subjected.

The invention will be further understood from the following examples which should not be construed as limiting in any sense. All of the following compositions were compounded in the mixing chamber of a BRABENDER PLASTI-CORDER, operated at 25 rpm, by mixing the components and heating until a homogeneous composition was produced. All percentages, unless otherwise indicated, are by weight.

| Ingredient | % by Weight |
|---|---|
| Example 1 (239–171) | |
| Elvax 150 | 50.0 |
| Perimol 355 | 10.0 |
| DIDP | 5.0 |
| 163/169 White Microwax | 34.5 |
| Ethyl 330 | .2 |
| BHT | .3 |
| | 100.0 |

-continued

Example 2 (239-170)

| Ingredient | % by Weight |
|---|---|
| Solprene 414 | 20.0 |
| Elvax 150 | 30.0 |
| Primol 355 | 10.0 |
| DIDP | 3.0 |
| 163/169 White Microwax | 36.5 |
| Ethyl 330 | .2 |
| BHT | .3 |
| | 100.0 |

Example 3 (239-160)

| Ingredient | % by Weight |
|---|---|
| Solprene 414 | 29.5 |
| Elvax 150 | 29.5 |
| 130° M.P. Paraffin wax | 39.5 |
| Micromica C-3000 | 1.0 |
| Ethyl 330 | .2 |
| BHT | .3 |
| | 100.0 |

Example 4 (239-168)

| Ingredient | % by Weight |
|---|---|
| Solprene 414 | 30.0 |
| Elvax 150 | 20.0 |
| Elvax 310 | 6.0 |
| Primol 355 | 10.0 |
| DIDP | 5.0 |
| 163/169 White Microwax | 28.5 |
| Ethyl 330 | .2 |
| BHT | .3 |
| | 100.0 |

Example 5 (239-159)

| Ingredient | % by Weight |
|---|---|
| Solprene 414 | 30.0 |
| Elvax 150 | 30.0 |
| 130° F M.P. Paraffin wax | 39.5 |
| Ethyl 330 | .2 |
| BHT | .3 |
| | 100.0 |

Example 6 (239-118)

| Ingredient | % by Weight |
|---|---|
| Kraton G-2705 | 38.0 |
| Primol 355 | 9.5 |
| DIDP | 3.0 |
| 130° M.P. Paraffin wax | 10.0 |
| 163/169 White Microwax | 32.0 |
| Epolene C-16 | 7.0 |
| Ethyl 330 | .2 |
| BHT | .3 |
| | 100.0 |

Example 7 (239-158)

| Ingredient | % by Weight |
|---|---|
| Kraton G-2705 | 20.0 |
| Solprene 414 | 20.0 |
| Elvax 40 | 10.0 |
| 130° M.P. Paraffin wax | 49.5 |
| Ethyl 330 | .2 |
| BHT | .3 |
| | 100.0 |

Example 8 (239-167)

| Ingredient | % by Weight |
|---|---|
| Solprene 414 | 40.0 |
| Elvax 150 | 10.0 |
| Elvax 310 | 6.0 |
| Primol 355 | 10.0 |
| DIDP | 3.0 |
| 163/169 White Microwax | 30.5 |
| Ethyl 330 | .2 |
| BHT | .3 |
| | 100.0 |

Example 9 (239-176)

| Ingredient | % by Weight |
|---|---|
| Solprene 414 | 40.0 |
| Elvax 150 | 10.0 |
| Primol 355 | 10.0 |
| DIDP | 5.0 |
| 163/169 White Microwax | 28.5 |
| #1 Barytes | 5.0 |
| Titanium Dioxide R-900 | 1.0 |
| Ethyl 330 | .2 |
| BHT | .3 |
| | 100.0 |

Example 10 (239-174)

| Ingredient | % by Weight |
|---|---|
| Solprene 414 | 50.0 |
| Elvax 150 | 5.0 |
| Primol 355 | 20.0 |
| DIDP | 10.0 |
| 163/169 White Microwax | 14.5 |
| Ethyl 330 | .2 |
| BHT | .3 |
| | 100.0 |

Example 11 (239-144)

| Ingredient | % by Weight |
|---|---|
| Kraton 1102 | 50.0 |
| 163/169 White Microwax | 23.5 |
| Epolene C-15 | 20.0 |
| Elvax 310 | 6.0 |
| Ethyl 330 | .2 |
| BHT | .3 |
| | 100.0 |

Example 12 (239-177)

| Ingredient | % by Weight |
|---|---|
| Solprene 414 | 55.0 |
| Elvax 150 | 5.0 |
| Primol 355 | 20.0 |
| DIDP | 10.0 |
| 163/169 White Microwax | 9.5 |
| Ethyl 330 | .2 |
| BHT | .3 |
| | 100.0 |

Example 13 (239-175)

| Ingredient | % by Weight |
|---|---|
| Solprene 414 | 60.0 |
| Elvax 150 | 5.0 |
| Primol 355 | 20.0 |
| DIDP | 10.0 |
| 163/169 White Microwax | 4.5 |
| Ethyl 330 | .2 |
| BHT | .3 |
| | 100.0 |

Example 14 (239-163)

| Ingredient | % by Weight |
|---|---|
| Solprene 414 | 30.0 |
| Elvax 150 | 30.0 |
| 163/169 White Microwax | 34.5 |
| Primol 355 | 5.0 |
| Ethyl 330 | .2 |
| BHT | .3 |
| | 100.0 |

Example 15 (239-165)

| Ingredient | % by Weight |
|---|---|
| Solprene 414 | 30.0 |
| Elvax 150 | 30.0 |
| 175° BeSquare Amber Wax | 39.5 |
| Ethyl 330 | .2 |
| BHT | .3 |
| | 100.0 |

Solprene 414 is a thermoplastic rubber available from Phillips Petroleum Company. More specifically it is a radial block copolymer having a styrene-butadiene ratio of 40 to 60 and a molecular weight of about 150,000. It supplies rubbery characteristics to the composition. Its viscosity index is 1,200 meter-grams torque at 166° C.

Kraton 1102 is a thermoplastic rubber available commercially from the Shell Chemical Company. More specifically it is a linear tri-block copolymer having a styrene butadiene ratio of 28 to 72 and a molecular weight of about 90,000. Like the Solprene 414, it supplies rubbery characteristics and film strength to the composition. Its viscosity index is 860 meter-grams torque at 166° C.

Kraton G-2705 is a thermoplastic rubber available from the Shell Chemical Company. More specifically, it is a linear triblock copolymer with a center elastomeric block of an ethylene-butylene polymer and end blocks of thermoplastic polystyrene. It supplies rubbery characteristics and film strength to the composition and is more heat resistant than the other triblock molecules. It can be used alone or in combination with any of the thermoplastic rubbers disclosed to improve heat stability of the resulting composition.

Elvax is a tradename for ethylene/vinyl acetate copolymer and acid terpolymer resins consisting of acid-/ethylene/vinyl acetate copolymers. These resins are available commercially From E. I. du Pont de Nemours and Company, Inc. Equivalent copolymer resins useful in place of the members of the Elvax series are made by U.S. Industries Chemical Company and distributed under the tradenames Ultrathene and Vynathene.

Elvax 150 is an ethylene/vinyl acetate copolymer consisting of 32 – 34% vinyl acetate and has a melt index of 22 – 28. It complements the elastomeric portion of all the thermoplastic rubbers and provides film strength and adhesion to a non-porous substrate.

Elvax 40 is an ethylene/vinyl acetate copolymer consisting of 39 - 42% vinyl acetate and has a melt index of 55. It complements the elastomeric portion of all the thermoplastic rubbers and provides film strength and adhesion to a non-porous substrate.

Elvax 310 is an ethylene/vinyl acetate copolymer consisting of 24 - 26% vinyl acetate and has a melt index of 335 - 465. It is highly compatible with the microcrystalline petroleum waxes and provides lower viscosities at application temperature as well as some adhesion to the substrate.

Ethyl 330 is a high temperature antioxidant available from the Ethyl Corporation and is 1, 3, 5, trimethyl-2,4,6-tris [3,5-di-tert butyl-4-hydroxy benzyl] benzene.

BHT is a low temperature antioxidant available from Koppers Company and is a butylated hydroxy toluene.

163/169 Microwax ia a microcrystalline wax which enhances the viscosity of the composition to facilitate the "flow-in" of the liner forming composition.

Epolene C-16 and C-15 are low molecular weight polyethylene resins made by Eastman Chemicals, Inc., like the Elvax 150, they provide film strength to the liner composition and lower its viscosity.

Primol 355 is a paraffinic oil available from Exxon Chemical Co. It is added to the composition to supply a lower durometer.

DIDP is available from U.S. Steel. It is diisodecyl phthalate and is used to reduce tensile strength.

175° Be Square Amber Wax is a microcrystalline wax made by the Bareco Division of Petrolite Corporation. It is much softer than the 163/169 White Microwax and supplies a lower durometer.

1 Barytes is finely ground Barium sulfate available commercially from Pfizer Chemical Company.

Micromica C-3000 is a finely ground mineral mica, available from the English Mica Company. Both the mica and barium sulfate are added to the composition as fillers.

Titanium Dioxide R-900 is a well known white pigment.

175° Be Square White Wax is a microcrystalline wax made by the Bareco Division of Petrolite Corporation. It is much softer than the 163/169 White Microwax and supplies a lower durometer.

The following table summarizes some of the more important properties of the composition of the Examples 1 - 15.

percent. The high viscosity index of the composition of Example 13 (60% block copolymer) makes this composition unsuitable for high speed lining processes because it is impossible to control the rate of flow of the molten composition unless pressure is exerted well above the capabilities of conventional dispensing equipment. The composition of Example 1 is also unsuitable for the intended purposes. This composition is not as elastomeric as might be desirable and, because of the absence of any cross-linking, softens and loses its shape at about 63° C, a temperature too low to allow pasteurization.

The composition of Example 2 represents the lower limit of block copolymer percentage. At this low percentage, the thermoplastic rubber should be complemented with an ethylene/vinyl acetate copolymer or an acid/ethylene/vinyl acetate terpolymer to increase film strength in the formed gaskets. When the thermoplastic elastomer content is below 20%, it is extremely difficult to compound a composition having the combination of desired properties herein described.

It should also be noted that an important principle in compounding compositions in accordance with the invention is that thermoplastic elastomers of higher total molecular weight generally also have higher viscosity indices. In this regard, those skilled in the art will appreciate that when rubbers of higher molecular weight are employed, their percentage content should be lowered. Since the higher molecular weight block copolymers are also, in general, more stable than their low molecular weight counterparts, their use has some advantages.

The compositions of Examples 2 - 12, 14, and 15 are representative of operable hot melt formulations useful in the process of the invention. The end use of the bottle cap and/or food closure will dictate which composition should be employed. For most applications, the Shore A hardness of the formed liner should not exceed 85. The observations taken into account to determine the comments under "molding characteristics" were whether the composition struck to the unheated punch, whether there was adhesion to the closure, and whether a given shape was retained on removal of the punch.

These operable compositions also represent species of the invention which are useable with liner forming systems presently in use, e.g., the plastisol process equipment. Those skilled in the art will have little difficulty adapting the compositions of this invention to

TABLE OF PROPERTIES

| Example | Viscosity Index (Meter-Grams torque at 175° C) | Shore A Hardness 10 Sec. ASTM (D-1706) | Molding Characteristics | Density (25° C) | Comments |
|---|---|---|---|---|---|
| 1 | 2 | 78 | Not Suitable | .95 | Breaks easily |
| 2 | 5 | 82 | Good | .95 | Lacks cohesive strength |
| 3 | 12 | 85 | Good | .95 | Fair cohesive strength Breaks at 180°angle Poor rubbery properties |
| 4 | 10 | 80 | Good | .95 | Tough, rubbery |
| 5 | 12 | 84 | Good | .95 | Tough, rubbery |
| 6 | 35 | 71 | Good | .95 | Tough, rubbery |
| 7 | 12 | 68 | Good | .95 | Tough, rubbery |
| 8 | 18 | 74 | Good | .95 | Tough, rubbery |
| 9 | 22 | 67 | Good | .95 | Good strength, rubbery |
| 10 | 15 | 50 | Good | 1.08 | Good strength, rubbery |
| 11 | 20 | 80 | Good | .95 | Soft, rubbery |
| 12 | 35 | 50 | Good | .95 | Tough, rubbery |
| 13 | 55 | 51 | Good | .95 | Soft, rubbery |
| 14 | 17 | 85 | Excellent | .95 | Soft, very rubbery |
| 15 | 30 | 83 | Excellent | .95 | Tough, rubbery |
| | | | | | Tough, rubbery |

As can be seen from a study of the properties of the composition of the above examples, the block copolymer content can be varied between about 20 and 55 particular uses by, for example, adding other extenders, lubricants, fillers, pigments, and blowing agents as required.

Another class of hot melt compositions useful in the invention may be made from a number of low molecular weight polyethylenes. For example, Petrothene NA-596, available from U.S.I. Chemical Company, is a polyethylene resin having a viscosity index of 50 meter-grams torque at 158° C. This material is too hard and insufficiently elastomeric for most conventional sealing gasket applications but may be useful for seals where these properties may be tolerated. This material may also be blended, e.g., 50-50, with a member of the Elvax series disclosed above, e.g., Elvax 310, or with a member of the Ultrathenes or Vynathenes, to form a hot melt composition with broader utility. Although a 50-50 blend of Petrothene NA-596 and Elvax 310 is not as elastomeric as required for most applications, its viscosity index (30 meter-grams torque at 161° C) places it in the range of hot melt compositions useful in the process of the invention.

In use, as schematically illustrated in FIG. 1, a hot melt composition 10, compounded, for example, as disclosed in one of examples 2 – 12, 14, or 15 above, is inserted into the heated chamber of a conventional hot melt dispensing unit 14 having an insulated delivery tube 16 heated to at least the same temperature as the heated chamber and a nozzle 18 controlled for intermittent delivery by, e.g., a needle valve. The hot melt dispenser 14 heats the composition 10 to a uniform temperature between 160° and 210° C, i.e., well above the glass transition temperature of the thermoplastic segments of the block copolymer of the composition. One preferred temperature is about 190° C. At the chosen temperature, the composition will have a uniform viscosity (viscosity index below 40), so that the pressure applied on the molten composition in the hot melt dispenser 14 by a mechanical pump (not shown) forces the composition through the delivery tube 16 and the nozzle 18 of pre-determined size at a constant rate. Since no air will be present in the delivery tube, the temperature of the composition may be raised therein to improve flow properties by lowering the viscosity index without the danger of thermal degradation. This is advantageous for high speed operation.

The viscosity of the composition, the pressure exerted on the composition by the pump of the hot melt dispensing unit, and the orifice size of the nozzle are chosen such that a metered amount of molten composition 20, having the optimum volume for forming a liner in the desired closure shell 22, is deposited in each closure as it passes beneath the nozzle. The composition may be dispensed dropwise, for, e.g., crown lining applications, or may be dispensed in a continuous stream, in repetitive fashion, suitable for laying an annular strip of uniform cross-section in the sealing area of a crown, wide mouth bottle cap, etc. The closure 22 may be preheated to prevent premature coagulation of the hot melt composition. The closure liner may be shaped by a punch 24 of the type well known in the art having a die face 26 designed to mold the material to the desired liner configuration. As is conventional procedure, one or more nozzles and one or more punches may be employed, each being synchronized to deposit a metered amount of composition and to shape a closure liner or gasket as a closure shell passes therebeneath.

An alternative procedure contemplated by the present invention is to omit the punch 24 and to form the closure liner by rapidly spinning the closure in the manner well known in the art, such that the centrifugal force will, in the case of bottle cap liners, flaten out the metered amount of the composition and, desirably, leave a relatively thick, annular accumulation of the composition about the periphery of the interior of the closure. When this embodiment of the process is employed, a composition must be chosen having a sufficiently low viscosity to allow it to flow and be distributed as described. This modification usually requires heating the closure shell 22, and is particularly useful for forming wide mouth bottle cap liners wherein a ring of the composition is deposited.

It should be noted that at no point in this process is a heating oven employed, hence, a substantial saving in energy is realized. In addition, since there are no volatile components in the composition, no effluents are associated with the process. However, some heat conditioning of the hot melt liner or gasket in the closure may be desirable to improve adhesion to the closure, to improve flow out or leveling, or in the case where a ring gasket is laid down in a crown or other food closure, e.g., in a screw or lug cap.

Figure 2:
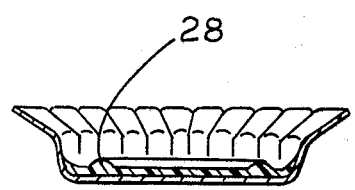
FIG. 2 is a cross section of a crown lined with the liner of the invention.

In one series of tests, a number of crowns were lined using the composition of Examples 2 – 12, 14, and 15, and the punch process to form the desired gasket shape. These crowns, depicted in FIG. 2, contain a gasket 28 which compares favorably with the prior art PVC gaskets in all respects, and, advantageously, were adhered to the interior of the crowns in the process.

Figure 4:
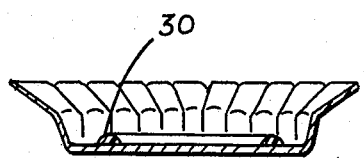
FIG. 4 is a cross section of a crown lined with the ring seal of the invention.
Figure 3:
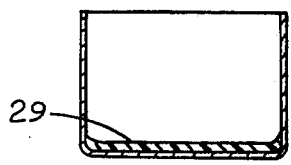
FIG. 3 is a cross section of a roll-on closure lined with the liner of the invention.
Figure 5:
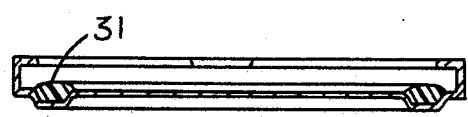
FIG. 5 is a cross section of a wide-mouth bottle cap lined with a ring seal of the invention.

It is also contemplated that a gasket 29 for roll-on closures, such as the type depicted in FIG. 3, a ring seal 30 for a crown (FIG. 4), and an annular gasket 31 for a variety of wide-mouth bottle and jar closures (FIG. 5), may be formed with the composition and process of this invention. Other uses for the compositions of the invention will be apparent to those skilled in the art including gaskets intended for use with bottles not containing food. For example, by suitable modification of the composition in accordance with the teaching of the invention, it is possible to form aerosol cap liners.

The invention may be embodied in other specific forms without departing from the spirit or essential characteristics thereof. The present embodiments and examples are therefore to be considered in all respects illustrative and not restrictive, the scope of the invention being indicated by the appended claims rather than by the foregoing description, and all changes which come within the meaning and range of equivalency of the claims are therefore intended to be embraced therein.

What is claimed is:

1. Process for producing a gasket in a closure to thereby render the closure capable of sealing a container, said process being characterized by the steps of:
    (a) providing a vinyl chloride free, elastomeric hot melt composition having a viscosity index less than about 40 meter-grams torque at 175° C and being capable of retaining a given shape when cooled;
    (b) heating the composition to cause it to flow;
    (c) depositing a metered amount of the flowable, heated composition from a nozzle into a closure shell;
    (d) shaping the composition in the closure shell to form a gasket; and
    (e) cooling the shaped gasket.

2. The process of claim 1 wherein the hot melt composition comprises between about 20 to about 55 percent of a thermoplastic elastomer chosen from the group consisting of:
(a) triblock copolymers of the type having the general formula ABA, wherein A is a thermoplastic segment of a polymerized alkenyl aromatic compound of average molecular weight within the range of about 2,000 to about 30,000 and wherein B is an elastomeric segment of polymerized diene selected from the class consisting of conjugated diene hydrocarbon compounds formed from monomers having four to eight carbon atoms and elastomeric copolymers of ethylene with butylene, said elastomeric segment having an average molecular weight within the range of 10,000 to 200,000, the total polymerized alkenyl aromatic compound content constituting from about 15 to about 65 percent by weight of the triblock molecule; and
(b) radial block copolymers of the type having a plurality of chains having the general formula BA wherein B is linked to a central hub and is an elastomeric segment of a polymerized diene selected from the class consisting of conjugated diene hydrocarbon compounds formed from monomers having four to eight carbon atoms and elastomeric copolymers of ethylene with butylene, said elastomeric segment having an average molecular weight within the range of about 10,000 to about 200,000, and A is a thermoplastic segment of a polymerized alkenyl aromatic compound of average molecular weight within the range of about 2,000 to about 30,000, the total polymerized alkenyl aromatic compound content constituting between about 20 to about 50 percent by weight of the radial block copolymer molecule.

3. The process of claim 1 wherein, in said heating step, the composition is heated to between 160° C and 210° C.

4. The process of claim 1 wherein the closure shell is heated.

5. The process of claim 1 wherein said shaping step is effected by contacting the composition in the closure shell with a die.

6. The process of claim 5 wherein the die is cooled.

7. The process of claim 1 wherein the hot melt composition comprises a blend of a polyethylene and at least one member of the class consisting of copolymers of ethylene/vinyl acetate and terpolymers of acid/ethylene/vinyl acetate.

* * * * *